March 30, 1965   H. H. STAM   3,175,622
SEALING DEVICE FOR FERTILIZER APPLICATOR
Filed March 12, 1964   2 Sheets-Sheet 1

INVENTOR.
HERBERT H. STAM
BY John N. Nesbitt
ATTORNEY

March 30, 1965  H. H. STAM  3,175,622

SEALING DEVICE FOR FERTILIZER APPLICATOR

Filed March 12, 1964  2 Sheets-Sheet 2

INVENTOR.
HERBERT H. STAM
BY John R. Nesbitt
ATTORNEY

United States Patent Office

3,175,622
Patented Mar. 30, 1965

3,175,622
SEALING DEVICE FOR FERTILIZER APPLICATOR
Herbert H. Stam, P.O. Box 86, Watseka, Ill.
Filed Mar. 12, 1964, Ser. No. 351,434
7 Claims. (Cl. 172—159)

This invention relates to fertilizer apparatus and more particularly to a sealer device for quickly closing the furrow formed by an applicator injecting liquid fertilizer into the soil.

The necessity for use of fertilizer for agricultural purposes is, of course, well known, as is apparatus for injecting liquid fertilizer into the soil. Commonly, such apparatus includes a plurality of tines, or blades, drawn through the soil to be fertilized, by a cultivator-type implement. While this method has been found to be acceptable in injecting the liquid fertilizer into the soil, it has been found desirable, for more efficient use of the fertilizer, to close the furrow created by the blade immediately after the liquid fertilizer is injected into the soil since the liquid fertilizer, which is usually anhydrous ammonia, vaporizes upon release from pressurized confinement in the storage tank and escapes to the atmosphere through the furrow and loosely packed soil adjacent to the furrow.

Devices designed to engage the ground immediately behind the applicator blade and close the furrow are commonly called sealers and are well known. A device designed to eliminate the grooves left by the shovel of a cultivator, as it passes through the soil, is shown, for example, in United States Patent No. 2,424,014 issued to John M. Bobeldyk on July 15, 1947, while a sealer for an anhydrous ammonia applicator is shown, again by way of example, in United States Patent No. 2,736,279 issued to Douglas Johnston on February 28, 1956.

It is a feature of this invention to provide a sealer device of the same general type as that taught in the prior art, but constituting an improvement thereover, particularly in providing a sealer the arms of which can be quickly removed without the use of tools and can be interchanged to provide an increased range of selectable tensions to be exerted by the sealer with respect to the ground, in providing a sealer the arms of which are protected against bending if the cultivator is backed while the sealer device is in engagement with the soil, in providing a sealer with a positive spring retention holder to preclude accidental variance from the tension selected by the operator, and in providing a sealer the scrapers (on the end of the arms and in contact with the ground) of which are adjustable horizontally, vertically and radially by adjustment of only a single mounting bracket.

It is therefore an object of this invention to provide an improved sealer device for use with a liquid fertilizer applicator.

It is another object of this invention to provide a sealer device that constitutes an improvement over the sealing devices known in the art in that said sealer device is more versatile and durable.

It is another object of this invention to provide an improved sealer device that is simple in structure and operation as well as being easy and inexpensive to manufacture.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
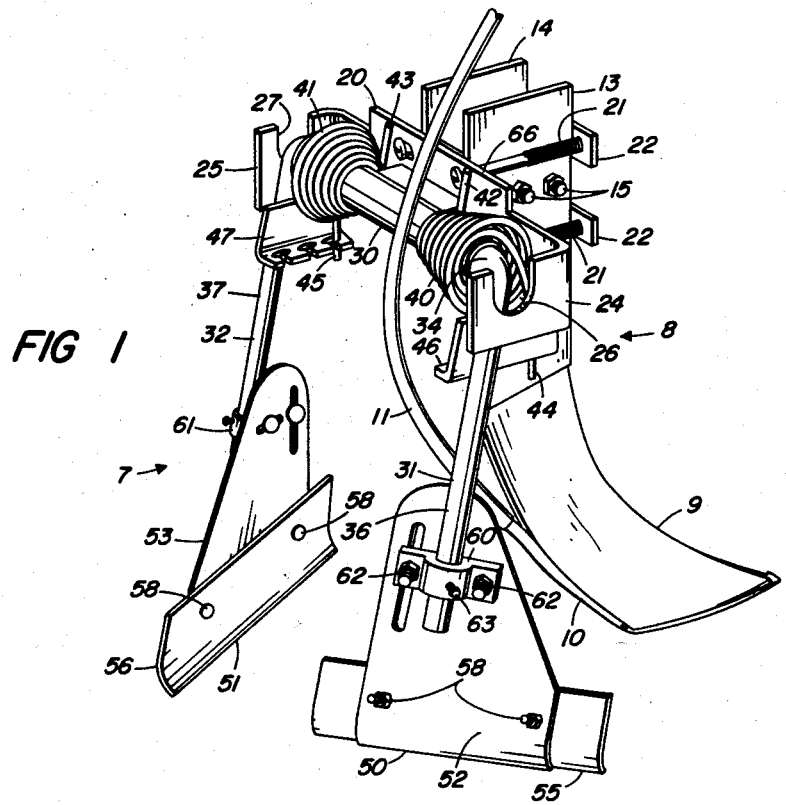
FIGURE 1 is a perspective view of the sealing device of this invention attached to a fertilizer blade unit.

Referring now to the drawings, in which like numerals have been used for like characters throughout, the numeral 7 refers generally to the sealer device of this invention shown attached to a fertilizer blade unit 8. Blade unit 8 includes, as is conventional, a blade, or knife, 9 having attached to the rear portion a tube 10. Tube 10 is connected at the top end to a hose 11 leading to a pressurized storage tank (not shown) filled with a liquid fertilizer, usually anhydrous ammonia. During fertilizer application, the liquid fertilizer is injected into the soil, from the lower end of tube 10, as blade 9 creates a furrow in the soil. Although the tube 10 is shown at the rear of blade 9, it is to be appreciated that it is not intended that the tube be restricted to this positioning on the blade, and could, for example, be on the front of the blade where conditions so dictate.

The upper portion of blade 9 has two holes therein (not shown) for mounting purposes and the blade is releasably mounted between a pair of spaced mounting plates 13 and 14, which plates likewise have two holes therein registering with those in said blade, by means of bolts 15. As is conventional, mounting plates 13 and 14 may, in turn, be fastened to a cultivator-type implement (not shown) and adjusted height-wise so that the lower end of the blade is inserted into the ground a predetermined desired distance.

Figure 5:
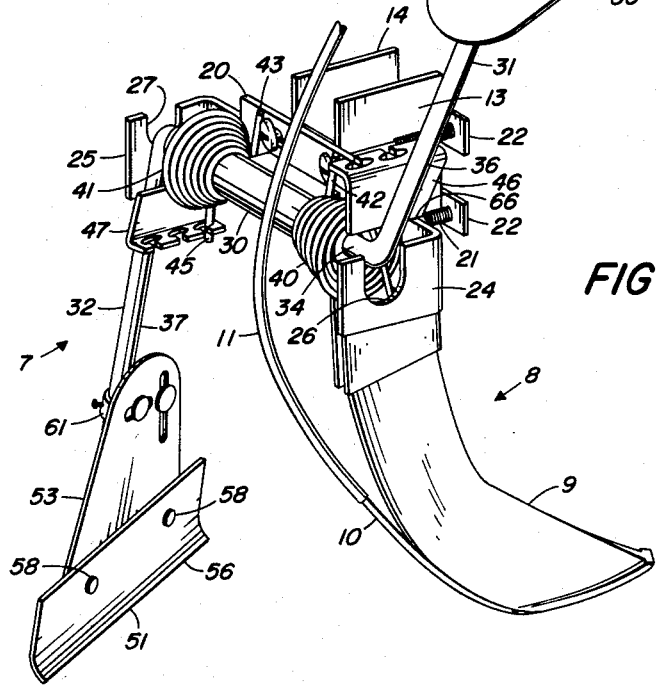
FIGURE 5 is a perspective view of the sealing device of this invention similar to that of FIGURE 1 except that one arm is shown pivoted to the dismantle position.

The sealer device of this invention is mounted on plates 13 and 14 so that the furrow created by the blade is immediately covered, after application of fertilizer, by the sealing device of this invention. For this purpose, a mounting plate 20 is positioned so that the rear edges of mounting plates 13 and 14 engage the front side of plate 20. Plate 20 is held in this position by means of bolts 21 and connecting strip 22 (in engagement with the front edges of plates 13 and 14). Mounting plate 20 terminates at each side edge in a flange (designated 24 and 25) each of which extend rearwardly and have a notch (designated by the numeral 26 for flange 24 and 27 for flange 25) cut into the top edge, as shown best in FIGURES 1 and 5.

A sleeve, or journal, 30 is fastened, as by welding, between flanges 24 and 25 and in line with notches, or slots, 26 and 27. For reasons as brought out hereinafter, only the central portion of the sleeve is welded to plate 20, and the ends (designated 28 and 29) are offset rearwardly from plate 20 and terminate short of flanges 24 and 25.

L-shaped arms 31 and 32, each of which is identical to the other and has a diameter slightly less than that of the inner diameter of sleeve 30, have their shorter portions 34 and 35, respectively, inserted into the opposite ends 28 and 29, respectively, of sleeve 30 so that the longer portions 36 and 37, respectively, thereafter swing in a vertical plane. As shown in FIGURE 1, in normal applicator use, arms 30 and 31 are retained in sleeve 30 by flanges 24 and 25, respectively, the spacing between the ends of sleeve 30 and the flanges being slightly greater than that of the diameter of each arm so that the shorter portion of the arm is free to rotate but is substantially precluded from longitudinal movement.

Sleeve 30 is offset from mounting plate 20, as brought out hereinabove, and springs 40 and 41 are positioned on the ends 28 and 29, respectively, thereof. One end of each spring (42 and 43 of springs 40 and 41, respectively) engages mounting plate 20, while the other end (44 and 45 of springs 40 and 41, respectively) is received in one notch of spring retainers 46 and 47, respectively. Spring retainers 46 and 47 are identical and only spring retainer 47 is described in detail herein. As shown best in FIGURE 4, spring retainer 47 consists of an L-shaped bracket one side 48 of which is fastened to the longer portion 37 of arm 32 (as by welding, for example), while the other side 49 has a plurality of T-shaped notches 50 therein, any one of which notches can receive and retain end 45 of spring 41. It has been found necesary to provide the T-shaped notches to assure positive retention of the end of the spring in position during fertilizer application, and it is to be appreciated that, while only three notches are shown herein, any number could be utilized and that the shape of the sides of the bracket and the shape of the notches (so long as the enlarged bottom section is retained) could be altered as deemed desirable without departing from the intended scope of this invention.

Figures 2, 4:
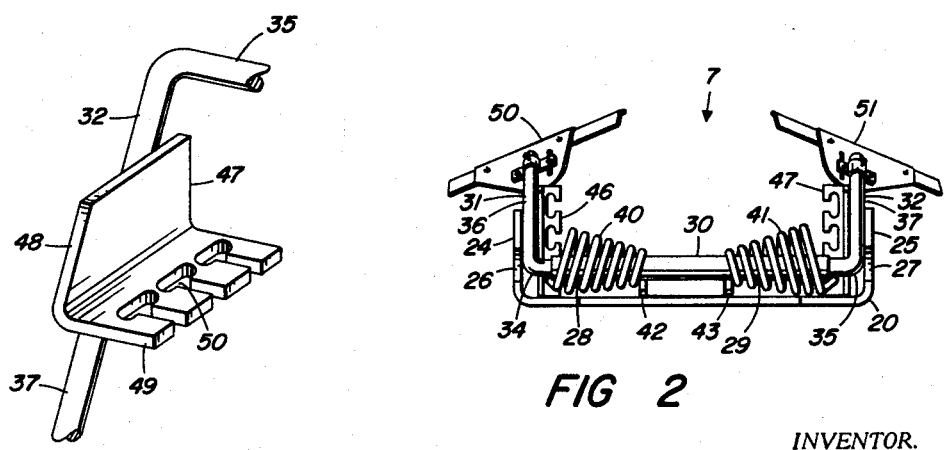
FIGURE 2 is a top view of the sealing device shown in FIGURE 1.
FIGURE 4 is a perspective view of the spring retainer plate attached to the arm of the sealing device.
Figure 3:
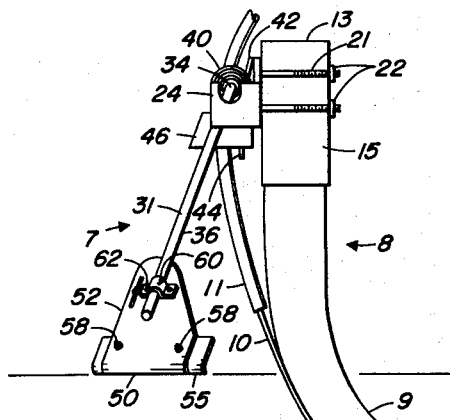
FIGURE 3 is a side view of the sealing device and blade unit shown in FIGURE 1.

As can be seen best in FIGURE 4, spring retainers 46 and 47 are fastened to arms 31 and 32, respectively, so that each side of the spring retainer having the notches therein is other than perpendicular with respect to the associated arm. This enables a greater biasing range to be achieved with a minimum of notches since the arms of the sealer device of this invention are readily reversible, or interchanged. When interchanged, the inclination of the notched side of the spring retainer is likewise reversed and the range of adjustment by spring tension is enhanced over that of prior systems.

At the end of the longer portion of each arm is adjustably attached a scraper, or leveler (designated 50 for arm 31 and 51 for arm 32). Each scraper includes a substantially triangular plate (designated 52 for scraper 50 and 53 for scraper 51) that is curved inwardly along the bottom portion to snugly engage a scraper blade (designated 55 for scraper 50 and 56 for scraper 51) that is also curved inwardly and is fastened to the bottom portion of the triangular plate by means of bolts 58. In addition, each triangular plate has both a vertical slot and a horizontal slot cut in the top portion. A mounting bracket (designated 60 for scraper 50 and 61 for scraper 51), having a U-shaped middle portion with legs at each side, is attached to the mounting plate by means of bolts 62, each of which bolts passes through a different slot in the triangular plate and through the opposite ends of the mounting bracket. The longer portions 36 and 37 of farms 31 and 32, respectively, are received in the U-shaped portion of the mounting brackets and a retaining screw 63 in the U-shaped portion releasably holds the arm in place as desired. It is thus another feature of this invention that the scraper can be adjusted horizontally, vertically, and radially merely by loosening the three bolts in the single mounting bracket used for each scraper, making the adjustment, and then retighten the bolts. It is still another feature of this invention that the arms are engineered, as shown in the drawings, to be protected from bending out of shape should the cultivator be backed up while the sealer devices are in ground engagement.

Before starting fertilizer application, the scraper blades are positioned by means of the single mounting bracket for each scraper, and the desired tension, exerted by the scrapers on the ground, is set by inserting the spring ends 44 and 45 in the proper notch of spring retainers 46 and 47, respectively (this can be done without the aid of tools). Should the operator later desire to make a change, this invention enables him to make the change very quickly and with ease. Should the operator merely desire more or less spring tension, he merely grasps the ends 44–45 of the spring and moves the same to a new notch in the spring retainers. If, however, he desires a spring tension other than that afforded by the notches cut in the spring retainer, he simply disconnects the spring from the spring retainer and rotates the longer portion of the arm to the dismantle position shown in FIGURE 5. In this position, the arm can be readily removed from sleeve 30 (without the aid of tools) and the arms interchanged (this gives a greater range of adjustment due to the positioning of the spring retainers on the arms as brought out hereinabove). It would, of course, also be possible to quickly substitute a new arm and scraper, if desired, rather than interchanging the arms on the sealer device. Rotation of the arm too forwardly is prevented by the top edge 66 and the bottom edge of mounting plate 30 which serves as a rotation stop. It is to be noted however that the top edge 66 of mounting plate 30 comes into contact with the arm only after the arm has passed the dismantle position.

In view of the foregoing, it should be obvious to those skilled in the art that this invention provides an improved sealer unit that is easily adjusted and/or dismantled, yet is durable enough for field use in the application of fertilizer.

What is claimed as my invention:
1. A sealing device for closing a furrow created by a fertilizer applicator, said sealing device comprising: a mounting unit including a mounting plate having a pair of substantially parallel flanges at opposite ends thereof; and first and second arm retainers mounted on said mounting plate between said flanges; a pair of arms each of which has a short portion received in said arm retainers and a long portion that swings in a substantially vertical plane between the end of one said arm retainer and the flange adjacent thereto, the distance between each said arm retainer and flange being less than the length of each said short portion whereby said short portion of each said arm is maintained in said arm retainer; a pair of springs mounted on said mounting unit, each of said springs having one end precluded against movement in at least one direction by means of said mounting unit; a pair of spring retainers, each of which has one portion mounted on a different one of said long portions of said arms and a second portion with a plurality of notches therein for receiving said end portion of a different one of said springs so that the arm associated with said spring retainer is biased downwardly toward the ground, each of said notches being enlarged at the bottom to assure retention of a spring end received therein, and said notches being positioned on each said spring retainer so that the downward force exerted by each said spring is different depending upon the notch selected; and scraper means mounted on said long portion of each said arm and engaging the ground behind the fertilizer applicator to seal the applied fertilizer in the ground by closing the furrow created by said applicator.

2. The sealing device of claim 1 wherein each of said scraper means includes a scraper mounting plate having a blade attached to the bottom portion and a mounting bracket connected to the top portion and to the long portion of one of said arms; said mounting bracket of said scrapers being adjustable so that said scrapers are adjusted horizontally, vertically, and radially by means of only said scraper mounting brackets whereby the blades of said scrapers engage the ground behind the fertilizer applicator in a manner so as to optimize sealing the applied fertilizer in the ground.

3. The sealing device of claim 2 wherein said scraper mounting plate has normally positioned slots therein with respect to one another and wherein said scraper mounting bracket is substantially U-shaped for receiving the long portion of said arm therein and includes means for releasably holding said bracket on said arm so that the distance between said bracket and the short portion of said arm may be adjusted, and has legs at each side, said bracket being connected to said scraper mounting plate by means passing through said slots in said scraper mounting plate and said legs of said bracket.

4. A sealing device for closing a furrow created by a fertilizer applicator, said sealing device comprising: a mounting bracket having a pair of substantially parallel flanges at opposite ends thereof, each said flange having a notch cut into one edge thereof; a sleeve mounted on said mounting bracket between said flanges and in line with said notches therein; a pair of interchangeable arms each of which has a short portion received in a different end of said sleeve and a long portion that swings in a substantially vertical plane between the end of said sleeve and the flange adjacent thereto, the distance between each said flange and the adjacent end of said sleeve being less than the length of each said short portion whereby said short portion of each said arm is maintained in said sleeve except when said long portion of said arm is rotated in a dismantle position in which said long arm is in line with said notch; a pair of springs wound about said sleeve, each of said sleeves having one end precluded against rotation by means of said mounting plate when said other end is forced in a direction away from said mounting plate; a pair of spring retainers each of which has one portion mounted on a different one of said long portions of said arms and a second portion that includes a plate the plane of which forms an acute angle with said long portion of said arm, said plate having a plurality of notches therein for receiving the free end of one of said springs to thereby bias the arm associated with said spring retainer toward the ground, said notches in said plate being positioned so that the downward force exerted by each said spring is different depending upon the notch selected and the direction of inclination of the plate with respect to the long portion of said associated arm; and scraper means mounted on said long portion of each said arm and engaging the ground behind the fertilizer applicator to seal the applied fertilizer in the ground by closing the furrow created by said applicator.

5. The sealing device of claim 4 wherein each of said notches in said spring retainer plate is substantially T-shaped.

6. A sealing device for closing a furrow created by a fertilizer applicator, said sealing device, comprising: a mounting unit having a pair of substantially parallel flanges at opposite ends thereof and rotation stop means, each said flange having a notch cut into one edge thereof, and a sleeve mounted on said mounting bracket between said flanges and in line with said notches therein; a pair of arms each of which has a short portion received in a different end of said sleeve and a long portion that swings in a substantially vertical plane between the end of said sleeve and the flange adjacent thereto, the distance between each said flange and the adjacent end of said sleeve being less than the length of each said short portion whereby said short portion of each said arm is maintained in said sleeve except when said long portion of said arm is rotated to the dismantle position in which said long arm is in line with said notch; said rotation stop means stopping the swing of each said arm, said rotation stop means engaging said arm only after the long portion thereof has been swung past said dismantle position; a pair of springs wound about said sleeve, each of said springs having one end engageable with said mounting unit and thereby precluded against rotation by said mounting unit when said other end is forced in one direction; a pair of spring retainers each of which has one portion mounted on a different one of said long portions of said arms and a second portion with a plurality of notches therein for receiving the free end of a different one of said springs to thereby bias the arm associated with said spring retainer toward the ground, each of said notches in said spring retainers being enlarged at the bottom to assure retention of the spring end received therein, and said notches in said spring retainer being positioned so that the downward force exerted by each said spring is different depending upon the notch selected; and scraper means mounted on said long portion of each said arm and engaging the ground behind the fertilizer applicator to seal the applied fertilizer in the ground by closing the furrow created by said applicator.

7. A sealing device for closing a furrow created by a fertilizer applicator, said sealing device comprising: a mounting bracket having rotation stop means and a pair of substantially parallel flanges extending rearwardly from the opposite side edges of said bracket, each said flange having a notch cut downwardly into the top edge thereof; a sleeve mounted substantially horizontally on said mounting bracket between said flanges and in line with said notches therein; a pair of interchangeable arms each of which has a short portion received in a different end of said sleeve and a long portion that swings in a substantially vertical plane between the end of said sleeve and the flange adjacent thereto, the distance between each said flange and the adjacent end of said sleeve being less than the length of each said short portion whereby said short portion of each said arm is maintained in said sleeve except when said long portion of said arm is rotated upwardly to a dismantle position in which said long arm is in line with said notch; said rotation stop means engaging said arm only after the long portion thereof has been swung upwardly and rearwardly past said dismantle position; a pair of springs wound about said sleeve, each of said springs having one end engaging said mounting bracket; a pair of spring retainers each of which has one portion mounted on a different one of said long portions of said arms and a second portion that includes a plate the plane of which forms an acute angle with said long portion of said arm, each said plate having a plurality of notches therein for receiving the free end of one of said springs to thereby bias the arm associated with said spring retainer toward the ground, each of said notches in said plate being substantially T-shaped to assure retention of a spring end received therein, and said notches in said plate being positioned so that the downward force exerted by each said spring is different depending upon the notch selected and the direction of inclination of the plate with respect to the long portion of said associated arm; and a pair of scrapers each of which includes a scraper mounting plate having a blade attached to the bottom portion and a mounting bracket connected to the top portion and to the long portion of one of said arms, said mounting bracket being adjustable so that said scrapers are adjustable horizontally, vertically and radially by means of only said scraper mounting brackets whereby said blades of said scrapers engage the ground behind the fertilizer applicator in a manner so as to optimize sealing the applied fertilizer in the ground.

No references cited.

T. GRAHAM CRAVER, *Primary Examiner.*